June 18, 1968   L. F. WESTPHALEN   3,388,650
MULTIFOCAL CAMERA

Filed Dec. 7, 1964   4 Sheets-Sheet 1

INVENTOR
LEONARD F. WESTPHALEN
BY Brown Jackson
Boettcher Dienner
ATTORNEYS

June 18, 1968  L. F. WESTPHALEN  3,388,650
MULTIFOCAL CAMERA

Filed Dec. 7, 1964  4 Sheets-Sheet 2

INVENTOR
LEONARD F. WESTPHALEN
BY Brown Jackson
Boettcher & Dienner
ATTORNEYS

June 18, 1968 L. F. WESTPHALEN 3,388,650
MULTIFOCAL CAMERA

Filed Dec. 7, 1964 4 Sheets-Sheet 3

INVENTOR
LEONARD F. WESTPHALEN
BY *Brown Jackson Boettcher & Dienner*
ATTORNEYS

June 18, 1968 L. F. WESTPHALEN 3,388,650
MULTIFOCAL CAMERA
Filed Dec. 7, 1964 4 Sheets-Sheet 4

INVENTOR
LEONARD F. WESTPHALEN
BY Brown Jackson
Boettcher & Dienner
ATTORNEYS

United States Patent Office 3,388,650
Patented June 18, 1968

3,388,650
MULTIFOCAL CAMERA
Leonard F. Westphalen, 5329 Kimbark Ave.,
Chicago, Ill. 60615
Continuation-in-part of application Ser. No. 216,674,
Aug. 13, 1962. This application Dec. 7, 1964, Ser. No.
416,510
The portion of the term of the patent subsequent to
May 25, 1982, has been disclaimed
7 Claims. (Cl. 95—44)

This is a continuation-in-part of application Ser. No. 216,674, filed Aug. 13, 1962, now U.S. Patent No. 3,185,061 issued May 25, 1965, and relates to an invention in attachments for a camera which provide an accessory objective having a range of effective focal lengths.

A principal object of the invention is to provide a camera with means by which the effective focal length of its objective can be increased at the convenience of the photographer to permit his taking close up pictures of a distant object, said means to comprise an accessory which may be removably attached to the camera or to another camera in place of its original objective.

Another object of the invention is to provide means and methods of modifying a camera having an objective of normal focus for distant objects so as to provide therefor a number of different equivalent focal lengths while maintaining the camera and its optical system compact and of minimum length.

A further object of the invention is to provide an attachment for a camera having a fast lens or objective of normal focus with means in the form of a negative lens or lenses which may be located behind the objective to increase its focal length at the election and convenience of the photographer and which also permits the objective to be used at its normal focus.

Within recent years, so-called zoom lenses having a continuously variable focal length have come into prominence and are receiving much attention from lens designers and manufacturers. However, such lenses necessarily comprise a large number of elements in order to maintain any semblance of a constant image plane as the spacings of the elements are shifted to change the focal length of the combination. The compensations and compromises which must be made and the complicated mechanical interlocking of the movable components necessary to obtain these complex movements of the elements make for a bulky, heavy and costly device which detracts from its appeal to the otherwise highly-interested photographers. The large number of lenses that are required in available zoom lens systems also introduces a problem of light and lens speed, such lens systems being usually confined to an aperture of f/3.5 or poorer. Usually also, although the system may be considered to provide an infinite number of focal length settings, the range within which the magnifications lie is limited, otherwise the system becomes unwieldly. The focusing range of such prior systems is also generally limited to not closer than 8 to 10 feet, whereas my invention allows sharp focusing of an object 3 feet or less from the camera. Also, its construction may be such as to allow the normal focus lens alone to focus a distance of up to twice its focal length, giving an image ratio of 1:1, or image size the same as the object.

It also has been proposed to provide a camera having interchangeable objectives each of a different focal length. These have been provided as separate units which may be removably mounted over the camera aperture. They also may be arranged on a turret indexed to selectively align each of the several objectives with the apertures. Multiplication of objectives is of course expensive and a camera equipped with a turret arrangement of multiple objectives is clumsy to use as well as bulky. The need to continuously replace objectives each time a different magnification of image is required also has its drawbacks.

By the present invention it is proposed to overcome all of the aforesaid disadvantages of the known prior art. In accordance therewith, not only is an objective provided whose focal length may be adjusted through a wide range of settings but also one which comprises a relatively small number of elements and the spacings of which remain small for each of the focal length settings which the objective accommodates, wherefore the total length of the objective is not unduly large for magnification factors up to four times and even greater.

These and other objects of the invention are obtained by inserting or removably locating one or more of a group of negative lenses of different focal power in axial alignment with the objective and therebetween and the image plane so as to be spaced from the principal plane of the objective a distance equal to less than its focal length. The effect is to relocate the second principal plane of the objective closer to the object thus lengthening the effective focal length of the objective.

It is a feature of the invention that the effective focal length of the objective is a function of the power of the inserted negative lens, wherefore the spacing of the negative lens from the film plane can be maintained as a constant. Therefore, magnification of the image is obtained by changing the power of the negative lens, and spacing of the objective from the negative lens is adjusted in accordance with the power of the selected negative lens so that the now enlarged image of the distant object is in sharp focus on the film. The distances through which the outer end of the objective must move to obtain different focal lengths can be kept short and so that the forward structure of the camera does not take on an unwieldy size even to achieve large magnification factors.

It is also possible in accordance with the invention to locate the objective at an extreme position from the image plane and to arrange the negative lenses of different focal power on a common mount but in different planes such that, as they are inserted into position behind the objective, they are correctly located to focus an image of the distant object at the film plane. The positioning of each negative lens on the optical axis automatically obtains the desired change in effective focal length without further spatial adjustments of either the objective or the negative lens.

It is a further feature of the invention that a construction is provided which allows the photographer to use the objective either in combination with a selected one or more of the negative lenses for close up shots or to use it alone where magnification is not wanted. It is further contemplated that this interchangeable use of the objective lens will be instantly available and will not require breakdown of the camera or rearrangement of its components or structural parts, and all operations and adjustments can be made from outside the camera or lens assembly.

Many other objects, advantages and features of the invention will be apparent or will become so from the more detailed description of the invention and preferred embodiments thereof which will now be described.

Referring therefore to the drawings:

FIGURES 4 and 5 illustrate a further embodiment wherein FIGURE 4 illustrates the negative lenses mounted on a turret wheel and FIGURE 5 is a fragmented view of a horizontal section taken through a camera and illustrates the turret wheel in assembled relation therewith;

FIGURES 6 and 7 illustrate still another embodiment of the invention wherein FIGURE 6 illustrates the negative lenses mounted on a removable slide and FIGURE 7 is a fragmented view illustrating the slide in position of use;

FIGURES 9 and 10 illustrate still another embodiment of the invention wherein FIGURE 9 is a side elevational view and FIGURE 10 is a sectional view taken along lines 10—10 of said figure;

Figure 12:
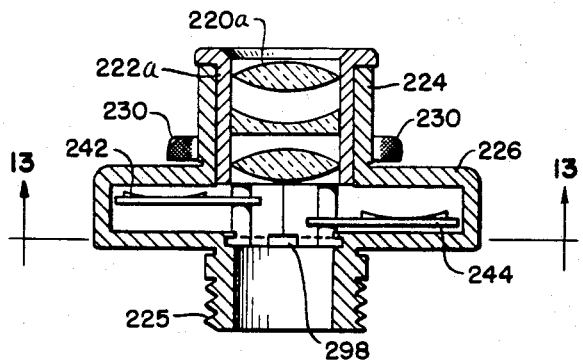
Figure 14:
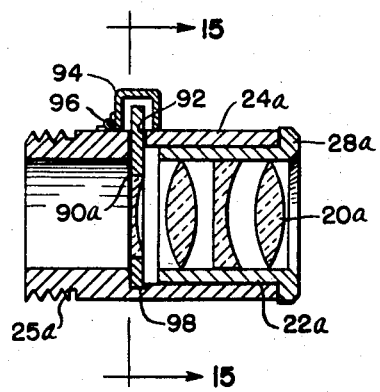
Figure 13:
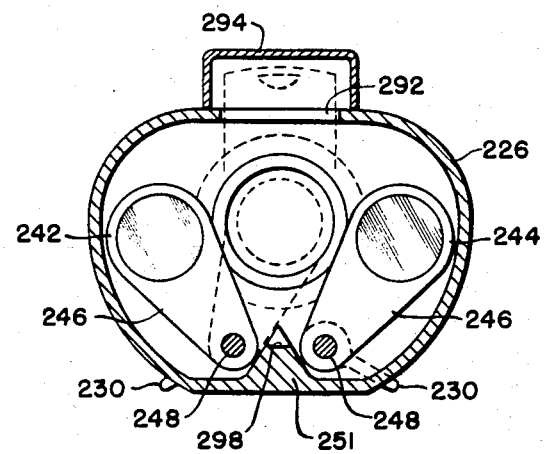
Figure 15:
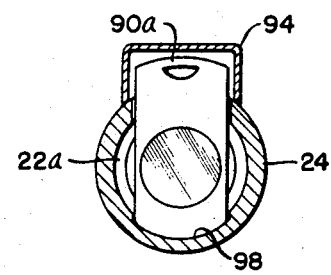

FIGURES 12 and 13 illustrate the invention embodied in an accessory comprising a second objective of the same or different focal length as the camera's original objective and which may be removably attached to the camera in place of its original objective; and FIGURES 14 and 15 illustrate still another embodiment of the invention where it comprises an accessory for replacing the original camera objective.

Figure 1:
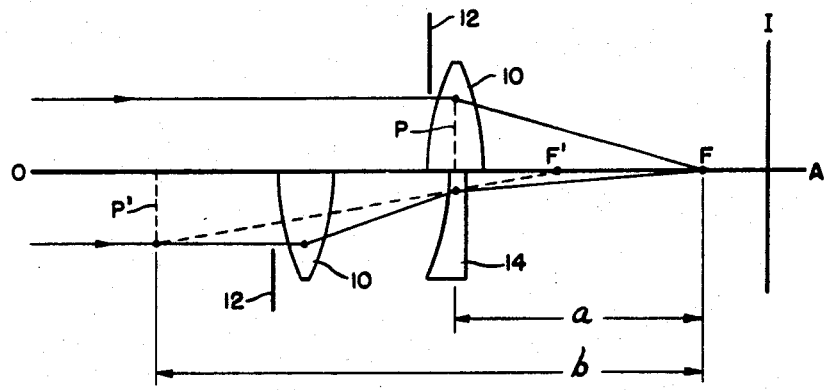
FIGURE 1 is a diagrammatic view which illustrates the invention.

Now referring more specifically to the several views and first to FIGURE 1, the invention will be understood by considering OA as the optical axis of the positive lens 10. As indicated in the upper half of the view, lens 10 receives light rays from the left-hand side and focuses the parallel rays to a point on said optical axis designated F. 12 represents an aperture stop which confines the entrant rays to the useful or best corrected portion of the lens so that an image of a distant object from which the parallel rays emanate will be in good definition at an image forming or film plane located at I behind focal point F. P represents the second principal plane of the lens 10 and the distance which separates its inner section of axis OA from F is considered to be the focal length of the lens 10.

It is well known that if a negative lens is spaced between the positive lens and its point of focus, then parallel light from a distant object entering the positive lens will be refocussed at a new point forwardly or further along the optical axis dependent on the focal power of the negative lens and its spacing from the positive lens. The effect is that the second principal plane of the positive lens is thereby moved closer to the object so as to increase the effective focal length of the positive lens. This telephotic principle of optics is employed to advantage in the present invention.

Referring therefore to the lower half of FIGURE 1, it will be seen that positive lens 10 has been moved to a new position along optic axis OA closer to the distant object and so that parallel light rays therefrom normally would be focused at F'. Negative lens 14, however, has been located in the position vacated by the positive lens 10. Being within the focal length of the positive lens 10 it diverts the light rays from point F' to a position forwardly thereof and closer to the image plane I. In the illustrated example, negative lens 14 has been selected to have a power such that it refocuses the parallel light rays received from positive lens and refocuses them at F. It therefore follows that this combination will also produce an image of the distant object at image plane I. However, since the second principal plane of the combination is not at P, but at P', the effective focal length of the combination has been changed from a length $a$ to better than twice $a$. This length is indicated at $b$. For a given field angle, the size of the image which can be produced by an objective is proportional to the distance of the film from the second principal point or primary plane of the objective, that is to say, it is proportional to the focal length of the objective. Therefore, in the second instance, use of the negative lens at 14 produced an image at I which has been magnified to be more than twice the image produced thereon by the positive lens alone. It will be understood that in the foregoing discussion the object being photographed is far distant so that the light rays are considered as emanating from infinity. Any change in field angle which therefore might theoretically result because of the relocation of the positive lens is so slight that it can be ignored.

If the power of the negative lens 14 is changed, so also will the focus of the optical system and therefore the magnification of the image at I. Magnification, therefore, can be largely a function of the power of the negative lens and changes in magnification can be obtained while maintaining the back focus of the system as a constant. In this event, some small amount of adjustment of the positive lens 10 will of course be required to obtain proper focus. Optionally, the negative lens might be axially adjusted the small distance required to obtain refocusing for each of the several possible magnifications.

Figure 2:
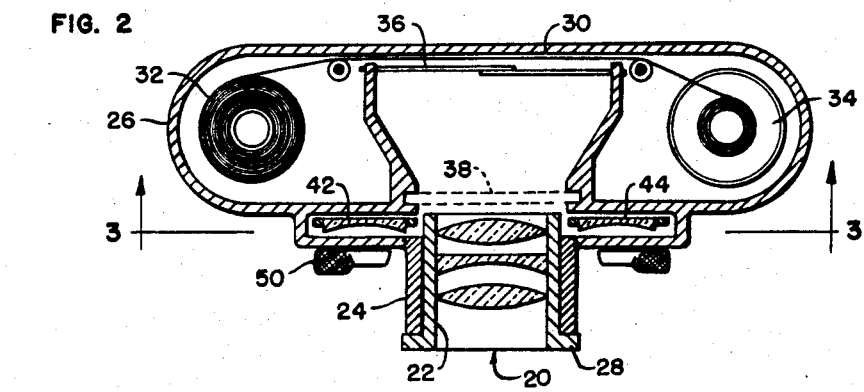
FIGURE 2 is a horizontal sectional view taken through a camera, illustrated in part schematically, and shows one embodiment of the invention.
Figure 3:
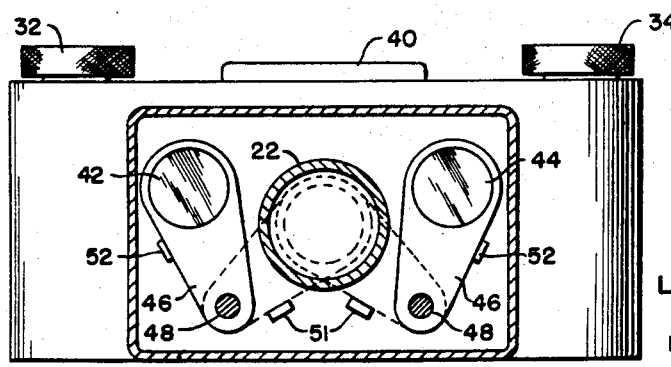
FIGURE 3 is a horizontal section view taken along lines 3—3 of FIGURE 2 looking in the direction of the arrows and shows further details in the mounting of the negative lenses.

It is therefore my proposal to provide an optical system for a camera embodying a positive lens of normal focus which may be axially spaced from the film plane for conventional photography. The camera will also be provided with a plurality of negative lenses each of a different negative power which I arrange so that they may be selectively located on the optical axis of the camera between the positive lens and the film plane either individually or in combinations when it is desired to take a magnified image of the object. The means employed for supporting the negative lenses and for adjusting their locations into and out of alignment behind the positive lens and on the optical axis thereof may take any one of several forms. For example, referring to FIGURES 2 and 3, a preferred embodiment of the invention is there illustrated as comprising a multi-element objective 20 supported in a tube 22. Objective 20 corresponds to the positive lens 10 of FIGURE 1, the number of elements having been multiplied so that by proper selection of curvatures, spacings, and indices of refraction, an objective may be obtained which is well corrected for coma, spherical and chromatic aberration astigmatism and the like, as is conventional in the art. It is thus to be understood that objective 20 is considered to be a well corrected objective of normal focus, that is, having a focal length equal roughly to the diagonal of the negative film frame and a relatively fast aperture, preferably of f2 or better. The invention is, however, not to be considered limited to an objective of a particular focal length or aperture size. Tube 22 is supported for sliding axial movement in a second tube 24 threadedly connected within the provided aperture of the camera housing indicated generally at 26. The outer end of tube 22 is preferably flared at 28, or is otherwise provided with means for limiting the inward movement of the objective 20. Flared end 28 serves to locate the objective at the proper distance from the film 30 when the objective is to be used at its normal focus position. 32 and 34 represent conventional film spools on which the film is mounted and have the usual operating means associated therewith which locate one frame of the film at a time on the optical axis OA the objective 20. 36 represents a conventional film plane curtain type shutter, although it is to be understood that any other type of shutter mechanism and location therefor may be utilized. 38 represents a supplementary lens which may be inserted through trap door 40 in the top of the camera housing to locate it between the objective 20 and the film plane when the occasion demands. Depending on the focal power of the objective 20 and the length of tubes 22, 24, it may also be useful for inserting a negative lens so as to be in axial alignment behind the objective as hereinafter described. At 42 and 44 are a pair of negative lenses, lens 42 having a different focal power than negative lens 44. As best seen in FIGURE 3, each of negative lenses 42 and 44 is similarly mounted on a support 46 having its lower end fixed ot a shaft 48 which extends through a suitable opening provided in the forward wall of the camera housing 26 and which constitutes a bearing for said shaft. On the outer side of the front wall of the camera housing 26, a lever 50 or other appropriate means is affixed to said shaft 48 which may be operated to move a respective one of the negative lenses from its position at rest as illustrated by the full lines in FIGURE 3, to a position in axial alignment with the objective, their latter position being illustrated by dotted lines in FIGURE 3. Stops are also provided at 51 which limit the inward swing of support 46 so as to assure alignment of the respective negative lens on the optical axis of the objective 20. Stop may be also provided at 52 against which the supports 46 engage when the negative lenses are in their non-use positions. As illustrated by FIGURES 2 and 3, when the two negative lenses are supported in a non-use position, they are also sufficiently displaced from the optical axis OA of the objective 20 so as to allow uninhibited axial movement of tube 22 to locate objective 20 and so as not to interfere with the setting of the objective for normal focusing at the film plane (FIGURE 2). When it is desired to obtain a magnified image of the object at said plane, tube 22 will be withdrawn a distance sufficient to allow one of the negative lenses 42 or 44 to be moved into alignment therebetween and the film plane. This is accomplished by rotating the lever 50. Tube 22 is then adjusted inwardly and outwardly until a clear sharp image is visible in the viewer (not shown) indicating that the objective is spaced from the negative lens for proper focus. It will be appreciated that in the near position of the objective 20 for normal focussing, its mount 22 is in the path of and thereby inhibits axial alignment of the negative lens or lenses with the objective. Also, if desired, a coil spring (not shown) may be arranged about shaft 48 and with one end joined to negative lens support 46 so as to resiliently tension said support so that it will engage the end of tube 22 when the objective 20 is at its near position and will automatically move into alignment behind the objective when tube 22 is withdrawn so as to locate the objective at its remote position. Such a construction will be of particular utility where only one of the two illustrated negative lenses 42, 44 are employed. In such a construction, the resilient tension of the coil spring will obtain said alignment by causing support 46 to engage stop 51 when tube 22 is withdrawn and handle 50 will be relied upon to return the negative lens and its support 46 to its offset position when it is desired to move tube 22 inwardly to again locate the objective 20 for normal focussing.

If objective 20 is considered to be a normal focus lens, for example, having a 50 mm. focus and an $f/2$ aperture, and negative lens 42 is considered to have a $-50$ mm. focus and negative lens 44 to have a $-25$ mm. focus, then the camera illustrated by FIGURES 2 and 3 may be considered as having a multi-focal objective comprising a 50 mm. focus $f/2$ lens when the objective is used alone, a 100 mm. focus $f/4$ lens when the objective 20 is used in combination with the negative lens 42 and a 150 mm. focus $f/6$ lens when the objective 20 is used in combination with the negative lens 44. In the above example, the camera is considered as producing 24 by 36 mm. negatives. If the objective 20 were designed as a 75 mm. focus with an $f/2.8$ aperture, as, for example, is conventionally used with cameras making 2¼ inch by 2¼ inch negatives, then, assuming negative lens 42 to be a $-75$ mm. focus and the negative lens 44 to be a $-37½$ mm. focus lens, the photographer would have a choice of a 75 mm. focus $f/2.8$ lens, a 150 mm. focus $f/5.6$ and a 225 mm. focus $f/8.4$ lens.

The above two examples are, of course, given merely to illustrate the invention and any other combination of focal lengths and apertures may be selected and obtained by appropriate design of the negative and objective lenses. Also, it will be understood that any number of supports 46 may be provided each with one or more negative lenses so that by proper pivoting thereof a selected one of a series of negative lenses may be positioned on the optical axis of the objective to obtain any desired number of different magnifications. It is also within the scope of the invention to adapt the supports for the negative lenses so that more than one negative lens may be positioned at a time in alignment with the objective that is one behind the other so as to obtain their cumulative effect on the focal length of the objective and produce further magnifications of the image on the film 30. Thus, in accordance with the invention by proper selection of the powers and number of negative lenses, as well as their spacing from the film plane and each other, an optical system can be provided having equivalent focal lengths ranging from that of the normal focal lens (used without the negative lenses) to ten or more magnifications. The length of the tubes 22 and 24 will, of course, be determined by the choice of powers for the negative lenses 42 and 44 and the focal length of the objective, their lengths being selected to allow the objective to focus sharply on the film plane when used either alone or with any one of the negative lenses.

Although, as thus far described, the objective has been described as mounted in the inner one of a pair of frictionally engaged telescoping tubes, it will be understood that any other arrangement for obtaining axial movement of the objective may be utilized. Other examples for obtaining such movement would include a rack and pinion, a bellows arrangement, also a helical threaded connection between telescoping tubes.

Figure 4:
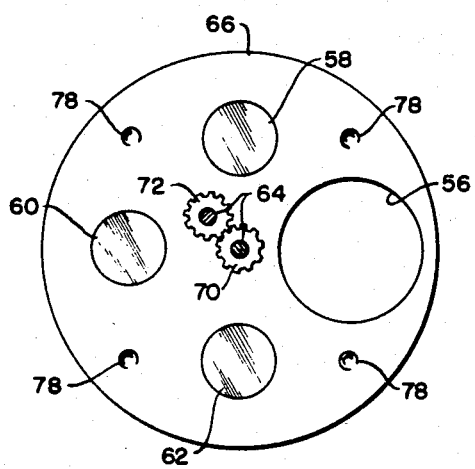
Figure 5:
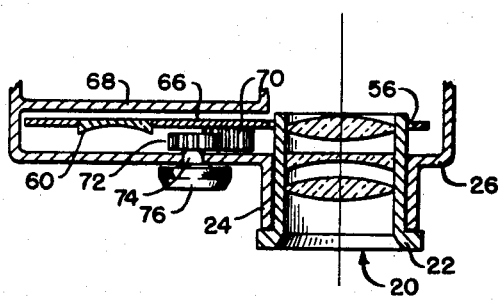

Instead of mounting the negative lens supports so that they may be pivoted into their required right angular relation with the optical axis of the objective, other means may be employed for obtaining movement thereof into and out of alignment with the optical axis. For example, referring to FIGURES 4 and 5, three negative lenses 58, 60 and 62 are shown supported by a turret or wheel 66, which is rotatably mounted as by pin 64 supported between the front wall of the camera housing 26 and wall 68 which forms one side of the film spool enclosures. Wheel 66 also has an enlarged opening at 56 which is large enough to permit passage of tube 22 therethrough when properly aligned therewith. It will be understood that any other means of mounting the wheel may be utilized. The axis of pin 64 about wheel 66 is disposed parallel to optical axis OA of the camera. Opening 56 and negative lens 58, 60, or 62 are so spaced from said pin that each may be selectively brought into coaxial alignment with the optical axis of the objective 20 by rotation of wheel 66. Its rotation may be effected in any convenient manner. In FIGURES 4 and 5, a pinion 70 is shown mounted on pin 64 and meshing with a second pinion 72 fixed to shaft 74 so as to be turned by rotation of shaft 74. Shaft 74 extends through a provided opening in the front wall of the camera and has a knob 76 fixed to its outer end. By turning knob 76, a selected one of the negative lenses or the opening 56 may be aligned with the objective. Appropriate scale means may be provided on the front wall of the camera housing 26 and knob 76 may have a suitable index which aligns with said scale to indicate the particular magnification for which wheel 66 is set. Indexing means (not shown) such as a spring tensioned pin may also be provided to engage with indents 78 provided in wheel 66 to assure proper axial alignment of the negative lenses and/or opening 56 with objective 20. As previously noted, opening 56 is made sufficiently large that, when aligned with the objective, the objective and its supporting tube 22 may be positioned through the wheel in order to locate the objective at its normal focal position.

Instead of mounting the negative lenses on swingable mounts (FIGURES 2 and 3) or on a rotatable turret wheel (FIGURES 4 and 5), other suitable means may be employed. For example, the camera may be adapted to receive slide 90 (FIGURE 6) on which one or more negative lenses is mounted. Referring to said FIGURE 6, slide 90 is shown provided with three negative lenses 92, 94 and 96, each of a different power. Said slide is also provided with a recess 98 by means of which it may be conveniently grasped for insertion through a suitable opening in the side or top of the camera to engage in a rim or other guide means which would locate the negative lenses at a constant distance from the film plane corresponding to the back focus of the objective 20. Spring pressed pin or detents (not shown) are also provided to engage in appropriately arranged indents 91 which center the negative lenses on axis OA and in alignment between the objective 20 and the film plane.

Figure 7:
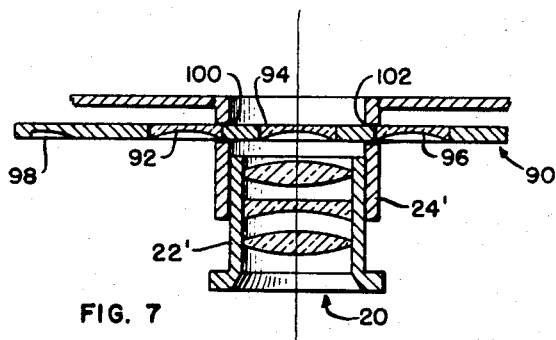

The invention is also equally well adapted as an accessory attachment for a conventional camera. Referring to FIGURE 7 the objective 20 is shown mounted within a tube 22' which in turn is telescopically arranged within a tube 24' corresponding to tube 24 of FIGURE 2. Tube 24' has an externally threaded attachment end 25 by means of which it may be removably mounted in the aperture of the camera housing 26 in which the original objective and its mount were threadedly connected. In this form of the invention, tube 24' is provided with a pair of aligned slots 100 and 102 of a dimension to receive negative supporting slide 90 for aligning the negative lenses on optical axis OA and at right angles thereto. Tube 22' is of sufficient length that it locates objective 20 within the aperture of the camera housing 26 at its normal focus position and when in this position also covers slots 100, 102 to prevent the entrance of stray light to the interior of the camera. Slide 90 will be so dimensioned as to snugly fit with the walls of the slots and otherwise to occlude stray light when positioned in slots 100 and 102. Preferably, however, a series of slides each bearing a negative lens of different power will be used, one such being illustrated at 90a in the embodiment according to FIGURES 14 and 15.

Therefore referring now to said FIGURES 14 and 15 an accessory attachment for a camera is shown having an objective 20a mounted within a tube 22a which in turn is arranged for telescopic movement within a principal supporting member or tube 24a. Tube 24a has an externally threaded attachment end 25a so that like the accessory attachment of FIGURE 7 it may be optionally mounted on the front wall of the camera in place of the objective and mount originally provided the camera. Tube 22a constituting the supporting for objective 20a also has a flanged end 28a which limits the inward adjustment of tube 22a within 24a and therefore can be used to indicate the near position of the objective 20a where it is located for normal focussing purposes. As thus far described, the negative lens or lenses which are located behind the objective when the latter is at its remote position occupy a location corresponding to the rear surface of the objective when at its near position for normal focus. This is the preferred and most satisfactory arrangement for the reasons set forth. However, objective 20a advantageously can be selected to have a different focal length than the original camera objective so that it may be used interchangeably therewith, either alone or having its focal length modified by the insertion of a negative lens, at the election of the camera user. In this event, it will be necessary to lengthen tube 24a to accommodate the longer focal length of objective 20 at its near or normal focussing position and wherefore as illustrated in FIGURE 14, room is left between the end of tube 22a and attachment end 25a of supporting tube 24a for an entrance 92 to permit the convenient insertion and removal of a negative lens bearing slide 90a. As shown in FIGURE 15, slide 90 has an end portion which extends out through entrance 92 and the bottom edge of slide 90a is of an arcuate shape corresponding to the inner curved surface of tube 24a whereby, in cooperation with the slot 92, slide 90a is correctly aligned and centered behind the objective 20a. A cover or cap 94 is hingedly connected to the outer wall surface of tube 24a by a spring tensioned hinge member 96 so that its edge resiliently engages about slot 92 to prevent the entrance of stray light therethrough. Usefully cap 94 is of convex shape to provide clearance for the protruding end of the slide 90a. If desired, the edges of cap 94 may be provided with felt or other resilient material which will insure a light tight fit thereof against the outer wall surface of tube 24a. It will be appreciated that any number of slides 90a each having a lens of different negative power may be provided. Therefore a camera owner may use his camera to take pictures of one object relying on its original objective; he may also take a picture of the same object but of a greater magnification by substituting the accessory and using its objective 20a at its near position; and he may also take pictures of the same object but with still greater magnification by inserting one of a series of slides 90a and properly adjusting the separation of objective 20a forwardly thereof.

As previously indicated, slide 90 also may be mounted within the housing of the camera. In this event slide 90 might be provided with an opening of sufficient diameter which would allow supporting tube 22' and its objective 20 to be passed therethrough as in the embodiment of FIGURES 4 and 5. Conversely, an accessory attachment could be provided wherein tube 24' would be provided with a turret wheel corresponding to wheel 66 of FIGURES 4 and 5. Such a construction can be made relatively small and compact since the clear opening 56 thereof as well as the negative lenses need only have a diameter corresponding to the cone of light exiting from the rear surface of the objective and which will be relatively small in comparison to the diameter of the cone of light which enters the front surface of the objective.

Additionally, as illustrated by FIGURES 12 and 13, an accessory attachment according to the invention may utilize the arrangement of the first discussed embodiment illustrated by FIGURES 2 and 3. Thus in FIGURES 12 and 13, objective 220a is of longer focal length than the original objective of the camera with which the accessory is to be used. It is mounted within a tube 222a which telescopically fits within an outer tube 224. Tube 224 corresponds to tube 24a of FIGURES 14 and 15 in that it also has an attachment end 225 externally threaded so that it may be optionally attached to the camera in place of the original objective. However, unlike the FIGURE 14 embodiment, it is provided with an enlarged housing portion 226 which serves to receive a pair of negative power lenses 242, 244 carried by supports 246 in turn pivotally connected by axles 248 to the front wall of housing 226 and provided with externally located handles 230 by means of which the respective negative lens may be selectively moved into position behind objective 220a and centered axially therewith when its support 246 abuts the adjacent one of stops 251. Negative lenses 242 and 244 are of different power and together with their supports 246 lie in different planes so that each may be used alone centered behind objective 220a or both aligned therebehind. In addition, an entrance 292 may be provided in the top wall of casing 226 and covered by a concave cap 294 hinged thereto as shown in FIGURES 14 and 15 which will permit the insertion of a slide corresponding to 90a if a lens of negative power other than provided by lens 242 or 244 is required. For this purpose, stops 251 are so located and suitably notched that their top edges also serve as abutments to properly center slide 90a. Conceivably, entrance 292 may be located other than in the plane of either negative lens 242 or 244 so that it will be possible to align the negative lens of slide 90a with both lenses 242 and 244 centered behind the objective 220, thus permitting even greater latitude in changing the effective focal length of objective 220a. It will of course be understood that depending on the power of the negative lens or lenses and the number thereof inserted behind the objective, the spacing of the objective 220 forwardly thereof will vary in order to accommodate proper focusing of a sharp image on the film plane. This is achieved conveniently by axially adjusting tube 222 within tube 224.

As thus far described, some axial adjustment of the objective is necessary once the negative lens has been located in alignment therewith. This is to obtain sharpening of the focus on the film plane. However, it would be possible to hold the position of the objective at a constant distance from the film plane for each of the different powers of the negative lenses, if some compensating factor were introduced.

Figure 8:
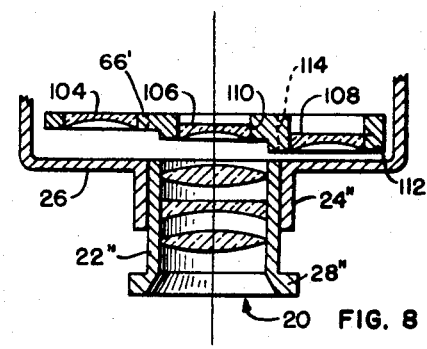
FIGURE 8 is a fragmented horizontal sectional view taken through a camera and illustrates a further modification of the invention.

Referring to FIGURE 8, a further embodiment of the invention is there illustrated in a camera having a housing 26 within which is mounted a wheel 66'. Said wheel corresponds to wheel 66 of the embodiment of FIGURES 4 and 5 and is rotatably mounted to the camera wall housing in a similar manner. Within the camera aperture are a pair of telescoping tubes 22" and 24", the latter being shown as an integral part of the camera housing 26. Inner tube 22" supports the objective 20. In this embodiment, negative lenses 104, 106 and 108 do not lie in a common plane. For example, negative lens 106 is shown mounted within a rim portion 110 which protrudes from the surface of the wheel. Negative lens 106 therefore lies in a plane a distance to the left of the plane in which negative lens 104 is supported. Negative lens 108 is also supported in a projecting rim portion 110 but so that it lies in a plane still farther to the left. In this embodiment, objective 20 is considered to be adjustable between two positions, its outer position illustrated by FIGURE 8 where tube 22" is shown fully extended, and an inner position which it reaches when the tube 22" is moved through opening 112 provided in wheel 66', to the limit permitted by its flared end 28". At said inner position of the tube 22", the objective 20 is considered to be located at its position for normal focus. When it is desired to take magnified pictures of a distant object, tube 22' is withdrawn from said inner position to the position illustrated in FIGURE 8. In this position of tube 22" wheel 66' can be rotated to selectively align one of the negative lenses with the objective. As aforedescribed, each of the negative lenses 104, 106 and 108 lies in a different plane. This plane has been calculated in accordance with the power of the negative lens and the outer position of the objective 20 so that when rotated into axial alignment with the positive lens or objective 20, it will also be located at a distance so as to compensate and/or correct for out-of-focus condition, and thereby eliminating the need for further axial adjustments of the objective.

Figure 9:
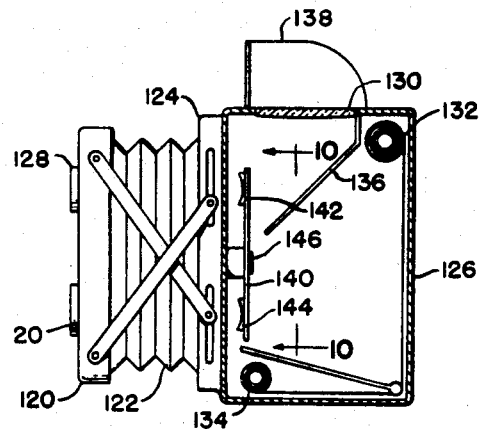
Figure 10:
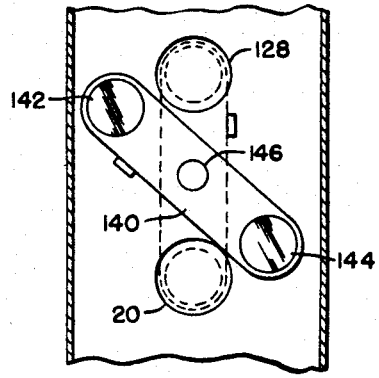

Referring to FIGURES 9 and 10, the invention is there illustrated as embodied in a so-called twin lens reflex camera. In said views 20 represents the objective supported by lens board 120 on the forward end of a bellows 122 which can be folded inwardly to locate lens board 120 against or within a recessed portion of the supporting frame 124 on the forward side of the camera housing 126. 132 and 134 represent film supporting reels corresponding to reels 32 and 34 of FIGURE 1, for example. Lens board 120 also supports a focusing lens 128 corresponding to the objective 20 which focuses an image of the object to the ground glass viewing screen 130 by means of a reflector 136. Such a camera is usually provided with a focusing hood 138 and may be equipped with either a lens shutter or a focal plane shutter. On the film plane side of frame 124 is supported member 140 (FIGURE 10) having negative lenses 142 and 144 of equal power mounted in its opposite ends. Member 140 is mounted on frame 124 to swing about a pivot connection 146 equidistantly spaced between the optical axes of the objective 20 and focusing lens 128. Appropriate operating means are provided by which said member 140 may be swung about its connection 146 to optionally locate the negative lenses on the optical axes of said objective and focusing lenses (shown in dotted lines) or to one side thereof (shown in full lines). In the extended position of the bellows 122 the objective 20 and focusing lens 128 are properly positioned so that with the negative lens aligned on their optical axes, a magnified image of a distant object will be focused on the film plane and also visible in the ground glass 130. With the negative lenses moved to one side of said axis and the bellows folded, the objective 20 and focusing lens 128 are spaced from the film plane and ground glass viewing screen, respectively, for normal focusing of near and far distant objects.

Figure 6:
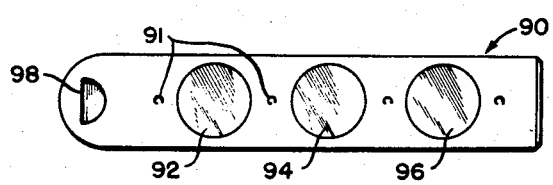
Figure 11:
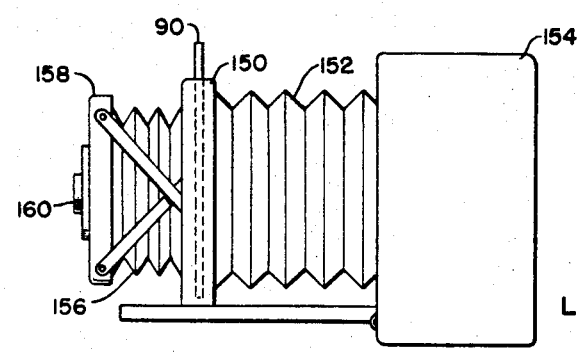
FIGURE 11 illustrates a still further embodiment of the invention and using the slide type mounting of negative lenses as illustrated in FIGURE 6.

In FIGURE 11, a press camera is shown modified in accordance with the present invention. Such a camera is conventionally provided with a lens board 150 mounted on the forward end of a bellows 152 which may be unfolded to locate an objective supported by the lens board 150 at the proper distance from the film plane with the camera housing 154 for normal focusing of near or far objects. In accordance with the present invention such a camera is modified by mounting a second bellows 156 on the forward end of lens board 150 and providing a second lens board 158 on the forward end thereof to support the objective 160. Lens board 150 is modified by providing it with means by which a negative lens may be located on the optical axis of the objective 160. The negative lens may be mounted in a slide 90 such as illustrated in FIGURE 6 or it may be mounted on a turret wheel as in FIGURE 4, a pivoted support as in FIGURE 3, or other convenient means may be employed, lens board 150 being suitably constructed in accordance with the particular support provided for the negative lens or lenses. When bellows 156 is folded to locate lens board 158 against lens board 150 and with no negative lens, the objective 160 is located by adjustment of bellows 152 for normal focusing on near and far objects. However, the objective may be located forwardly of lens board 150 by expanding bellows 156 and locating a negative lens in the lens board 150 on the optical axis of the objective to obtain magnification of an image of a distant object focused by the objective 160 at the film plane.

From the above description of several embodiments of the invention, it will be apparent that all of the recited objects, advantages and features of the invention have been demonstrated as obtainable in a convenient, simple, and entirely practical manner. Thus, in accordance with the invention, a high speed camera lens of short focus may be utilized in combination with means such as negative lenses of different focal powers which will allow a wide range of magnifications also at relatively wide apertures. For example, where an objective having an aperture of $f/1.4$ is employed, it is possible, according to the invention, to obtain a 2 magnification factor at $f/2.8$; a 3 magnification factor at $f/4.2$; a 4 magnification factor at $f/5.6$; and an 8 magnification factor at $f/11.2$. Furthermore, such a range of magnification factors can be obtained with practically no increase in the size of the camera, and with a very short travel of the objective. Furthermore, the invention may be embodied either in a camera or in an accessory as a replacement for or in addition to the original camera objective.

I claim:

1. For use with a camera having means detachably securing its objective in a position useful to focus an image of a viewed object on the film plane of the camera, an accessory device comprising, in combination, at least one negative lens, a supporting member having an attachment end by which it is securable to the camera in the place of the camera objective, a lens group of positive focus, and means forwardly of said attachment end for mounting said lens group within said supporting member so as to be axially movable therealong as a unit between a position adjacent to and a position remote from the attachment end of the supporting member, said lens group being adapted of itself alone when at said adjacent position and the supporting member is properly secured to the camera to focus an image of a viewed object on the film plane of the camera, said supporting member further having an entrance in a sidewall thereof in front of its attachment end through which the negative lens may be removably inserted behind the lens group in axial alignment therewith when said group is at its remote position, said axially movable lens group mounting means inhibiting the insertion of said negative lens when the lens group is at its said adjacent position, and closure means over said entrance which inhibit the entrance of light into the interior of the lens group supporting member, said negative lens being adapted to change the effective focal length of the lens group when so aligned therewith in order to permit focusing an image of the viewed object at the film plane of the camera which is magnified over that focused by the lens group when used alone.

2. An accessory for a camera to replace the objective thereof comprising the combination of a supporting member including a guideway aligned with said film plane, a first lens support axially adjustable on said guideway of the supporting member for movement toward and away from the film plane of the camera when mounted on the camera in place of the camera's objective, and a lens group comprising an accessory objective of given focal length mounted on said first lens support so as to move therewith as a unit and be retained in optical alignment with the film plane, the accessory objective being thereby movable inwardly to a first position spaced in front of the film plane where the lens group comprising the accessory objective is effective alone to focus an image of an object on the film plane, and outwardly from said first position to an alternate position more axially remote from the film plane, a second lens support and a single element lens mounted thereon, said single element lens being of negative power, and said second lens support being movable on said supporting member in a direction transversely of the direction of movement of the first lens support to permit locating the lens element of negative power between the accessory objective and film plane in axial alignment therewith for use when the accessory objective has been moved to its alternate position, the first lens support inhibiting said movement of the second lens support when the accessory objective is located thereby at its first position, and the lens element of negative power having a power such as to shift the second principal plane of the combination thereof and the accessory objective forwardly of the location of the second principal plane of the accessory objective when used alone whereby the accessory objective is used alone at said first position to focus an image of an object at said film plane of one magnitude and is used at its alternate position with the lens of negative power to focus a magnified image of said object on the film plane.

3. The combination of claim 2 wherein means are provided the second lens support to automatically move the lens element of negative power into alignment behind the lens group comprising the accessory objective when the latter is moved from its first to its alternate position.

4. An accessory for use with a camera having means detachably securing its objective in axially spaced position forward of the camera film plane, said accessory comprising a housing having a pair of oppositely disposed attachment ends, one of said attachment ends being adapted for attachment of the housing to said means of the camera when the camera objective is detached therefrom, the other attachment end of said housing being adapted for mounting an objective of positive focus on the housing in a position axially spaced forward of the film plane of the camera to which the accessory is attached, said housing including further means intermediate its oppositely disposed attachment ends by which a negative lens may be removably inserted behind the objective of positive focus in coaxial alignment therewith when mounted on the second mentioned end of the housing without detaching the objective of positive focus therefrom, the accessory when mounted on the camera thereby accommodating focusing of an image of an object on the camera film by using the objective of positive focus alone and also accommodating focusing of an enlarged image of the same object on the camera film by using the objective of positive focus in combination with the negative lens axially aligned therebehind.

5. An accessory for use with a camera having means detachably securing its objective in axially spaced position forward of the camera film plane, said accessory comprising a housing having a through bore and a pair of oppositely disposed axially aligned communicating attachment ends, one of said attachment ends being adapted for attachment of the accessory housing to said means of the camera with the axis of its through bore aligned with the film plane when the camera objective is detached therefrom, the other end of said housing being adapted for mounting an objective of positive focus thereon for relative axial adjustment in said through bore of the accessory housing with its axis on the axis of said through bore and spaced forwardly of the film plane of the camera to which the accessory it attached, two lenses each of a different negative power and mounts, one negative lens and a mount therefor pivotally secured to said housing for movement about an axis spaced to one side and parallel to the axis of the through bore, each negative lens being adapted by turning of its mount to be located behind the objective of positive focus when mounted on the second mentioned end of the housing and in coaxial alignment therewith without detaching the objective of positive focus therefrom, the accessory when mounted on the camera thereby accommodating focusing of an image of an object on the camera film by using the objective of positive focus alone and also accommodating focusing of differently enlarged images of the same object on the camera film by using the objective of positive focus with either one or both the negative lenses axially aligned therebehind.

6. A camera accessory as claimed in claim 5, wherein the housing is provided with an entrance through which an additional negative lens may be inserted for alignment behind the objective when attached to the mentioned other end of the housing, and light occluding closure means for said entrance.

7. For use in a camera having means detachably securing its objective forwardly of the film plane of the camera, the combination of a multifocal lens system and a support therefor having an attachment end by which it may be attached to said means of the camera when the camera objective is detached therefrom comprising the combination of an objective of positive focus axially movable on said support only, and a series of axially spaced negative lenses mounted on said support and having a different negative power, said negative lenses each being independently movable on said support and only transversely of the objective into and out of its optical path and coaxial alignment behind the objective, said movements of the objective and negative lenses being obtained without separating the lenses from the support, said objective having optical characteristics such that when axially spaced in front of the film plane of the camera with which it is used and with the negative lenses out of the optical path of said objective it will focus an image of an object on the film plane, each of said negative lenses when individually positioned in axial alignment behind the objective differently magnifying the image focused by the objective on the film plane, and said negative lenses when positioned collectively behind the objective in coaxial alignment therewith introducing further different magnification of said image.

References Cited

UNITED STATES PATENTS

| | | | |
|---|---|---|---|
| 1,991,530 | 2/1935 | Walker | 95—44 X |
| 2,188,764 | 1/1940 | Walsh | 95—44 |
| 2,381,228 | 8/1945 | Schmidt | 95—44 |
| 2,616,342 | 11/1952 | Thompson | 95—11 |
| 2,906,172 | 9/1959 | Klemt | 95—45 X |
| 2,963,950 | 12/1960 | Faasch | 95—44 |
| 2,995,074 | 8/1961 | Schmuck | 95—45 |
| 3,024,714 | 3/1962 | Keznickl | 95—44 |
| 3,067,664 | 12/1962 | Winslow | 95—44 |

JOHN M. HORAN, *Primary Examiner.*

NORTON ANSHER, *Examiner.*

UNITED STATES PATENT OFFICE
CERTIFICATE OF CORRECTION

Patent No. 3,388,650                          June 18, 1968

Leonard F. Westphalen

It is certified that error appears in the above identified patent and that said Letters Patent are hereby corrected as shown below:

Column 12, lines 34 to 36, cancel "the accessory it attached, two lenses each of a different negative power and mounts, one negative lens and a mount therefor pivotally secured to said housing for" and insert -- the accessory is attached, at least two lenses each of different negative power and mounts therefor pivotally secured to said housing for --.

Signed and sealed this 14th day of October 1969.

(SEAL)
Attest:

Edward M. Fletcher, Jr.                      WILLIAM E. SCHUYLER, JR.
Attesting Officer                                 Commissioner of Patents